(12) United States Patent
Narla

(10) Patent No.: US 10,183,583 B2
(45) Date of Patent: Jan. 22, 2019

(54) ENERGY GENERATION AND STORAGE SYSTEM WITH ELECTRIC VEHICLE CHARGING CAPABILITY

(71) Applicant: SolarCity Corporation, San Mateo, CA (US)

(72) Inventor: Sandeep Narla, San Jose, CA (US)

(73) Assignee: SolarCity Corporation, San Mateo, CA (US)

( * ) Notice: Subject to any disclaimer, the term of this patent is extended or adjusted under 35 U.S.C. 154(b) by 146 days.

(21) Appl. No.: 15/288,906

(22) Filed: Oct. 7, 2016

(65) Prior Publication Data

US 2018/0037121 A1 Feb. 8, 2018

Related U.S. Application Data

(60) Provisional application No. 62/370,582, filed on Aug. 3, 2016.

(51) Int. Cl.
| | |
|---|---|
| *H01M 10/46* | (2006.01) |
| *B60L 11/18* | (2006.01) |
| *B60L 8/00* | (2006.01) |
| *H02J 3/38* | (2006.01) |
| *H02J 9/06* | (2006.01) |
| *H02M 3/04* | (2006.01) |

(Continued)

(52) U.S. Cl.
CPC .......... *B60L 11/1811* (2013.01); *B60L 8/003* (2013.01); *B60L 11/1809* (2013.01); *H02J 3/383* (2013.01); *H02J 7/35* (2013.01); *H02J 9/061* (2013.01); *H02M 3/04* (2013.01); *H02M 7/44* (2013.01); *B60K 1/04* (2013.01); *B60L 2210/10* (2013.01); *B60L 2210/40* (2013.01); *B60L 2230/22* (2013.01)

(58) Field of Classification Search
CPC ........ H02J 7/0052; H02J 7/007; H02J 7/0013; H02J 2007/0059; H02J 7/0065
USPC ................. 320/104, 107, 114, 128, 140, 101
See application file for complete search history.

(56) References Cited

U.S. PATENT DOCUMENTS

| | | |
|---|---|---|
| 8,816,641 B2 | 8/2014 | Andrea et al. |
| 9,153,847 B2 | 10/2015 | Harty |

(Continued)

FOREIGN PATENT DOCUMENTS

EP 2562030 A2 2/2013

OTHER PUBLICATIONS

International Patent Application No. PCT/US2017/042044, "International Search Report and Written Opinion", dated Oct. 16, 2017, 15 pages.

*Primary Examiner* — Edward Tso
(74) *Attorney, Agent, or Firm* — Kilpatrick Townsend & Stockton LLP

(57) ABSTRACT

An inverter includes a battery pack connection for supplying energy to or receiving energy from a photovoltaic string, a battery pack, an AC grid connection for supplying power to or receiving power from an AC grid, a connection for supplying power to a home back-up load, an electric vehicle connection for supplying to and receiving power from an electric vehicle (EV) battery, and a control input configured to receive one or more control signals for controlling the flow of power within the inverter. The inverter, under the control of the one or more control signals, converts power received from one of different power sources and provides the converted power to charge a battery of the EV.

13 Claims, 13 Drawing Sheets

(51) Int. Cl.
    *H02M 7/44*    (2006.01)
    *H02J 7/35*    (2006.01)
    *B60K 1/04*    (2006.01)

(56) References Cited

U.S. PATENT DOCUMENTS

| | | |
|---|---|---|
| 9,263,968 B2 | 2/2016 | Potts et al. |
| 9,397,504 B1 | 7/2016 | Narla et al. |
| 2004/0062059 A1 | 4/2004 | Cheng et al. |
| 2011/0215640 A1* | 9/2011 | Donnelly ............... H02J 1/10 307/21 |
| 2013/0039104 A1* | 2/2013 | Sharma ............... H02M 1/10 363/123 |
| 2013/0113413 A1 | 5/2013 | Harty |
| 2015/0162784 A1 | 6/2015 | Kydd |
| 2015/0244306 A1* | 8/2015 | Estes ............... G05B 15/02 700/287 |
| 2016/0176305 A1 | 6/2016 | James et al. |

* cited by examiner

ENERGY GENERATION AND STORAGE SYSTEM WITH ELECTRIC VEHICLE CHARGING CAPABILITY

CROSS-REFERENCES TO RELATED APPLICATIONS

This claims the benefit of priority under 35 U.S.C. § 119(e) to U.S. Provisional Application No. 62/370,582, filed Aug. 3, 2016, which is hereby incorporated by reference in its entirety and for all purposes.

BACKGROUND

The disclosure relates generally to energy generation systems, and more particularly, to integrated solar energy generation, energy storage and electric vehicle charging systems.

In the United States only about one percent of homes currently are equipped with solar panels, and only about 1 percent of these homes are storing the generated electric power in batteries. A basic solar system consists of an array of panels oriented to receive direct sunlight, one or more inverters to convert the DC power from the array of solar panels to AC, and a physical interface to the customer's existing electrical system. Inverters come in two main form factors—micro-inverters, which are small inverters connected directly to one or more panels at the point of the array, and string inverters which receive the aggregated serialized output of several solar panels. An average solar powered U.S. home may have a 5 to 6 kW array requiring a 5 to 6 kW PV string inverter. This size system typically generates about 1,200 to 1,800 kWh of electricity per month depending on the geographical location and time of the year. Since a 3-bedroom home typically utilizes about 800 to 1,000 kWh per month, customers often generate excess energy, in particular during the summer. That excess electric energy can be fed to the utility grid. The process of back feeding excess power to the grid is known as net energy metering (NEM) or simply net metering. Existing net energy metering (NEM) incentives for PV inverters are about 8 to 12 cents/kWh. In other words, customers are compensated or credited by the utility in that amount for each kWh of power supplied to the grid. This excess energy can be used to offset the customers' consumption during times of year when solar power product is lower (e.g., during winter). Although popular with solar customers, net metering is increasingly under attack from entrenched utilities who want to compensate customers at lower rates, add monthly self-generation charges, and in some cases penalize customers for back feeding any power to the grid. This change in the regulatory landscape has made widespread deployment of storage critical to the continued growth of solar. By storing power generated during the day, customers can then utilize that power at night, reducing their reliance on grid power while maximizing the value of their solar system without needing NEM.

Electric vehicles (EVs) have also gained popularity recently due to great advances in lithium-ion battery technology that extends the range of EVs above 200 miles, drastic reduction in costs year over year, exciting new models of electric cars that rival or surpass the performance of comparable gasoline powered cars, and increased interest in supporting clean energy. These factors have caused the automotive industry to begin to shift focus to develop more electric vehicles (EVs). Products such as the Chevy Volt, Nissan Leaf, and Tesla Model S are currently very popular in the market. The energy capacity of the batteries used in these exemplary EVs varies widely. For example, the capacity of Chevy Volt's battery is 25 kWh, that of Nissan leaf is 35 kWh, and that of Tesla Model S ranges from 60 to 100 kWh. On average, every kWh of energy can provide about 3 to 5 miles of driving range to these EVs.

EV drivers have to charge their vehicles regularly, either at home, at work, or in one of many publically available EV charging stations (e.g., shopping centers, privately owned charging stations, or in the case of Tesla, one of the proprietary stations in their network of Superchargers). The number of miles of range obtained per unit of charging time will depend on how much current is conducted by the charger. Today's chargers for EVs can be categorized into three types: slow chargers that supply about 5 kW, medium chargers that supply about 15 to 30 kW, and fast chargers that supply about 100 to 135 kW.

The proliferation of EVs will increased the demand for electricity and should have a positive effect on the adoption of solar. However, the generation of solar energy has a diurnal cycle, and is therefore not be available in the nighttime when EVs often need to be charged. Therefore, storage of electrical energy for continuous electricity provision at any time of the day and advanced electric charging systems also need to be developed along with the increased deployment of EVs. Current solar energy generation and storage systems provide no provisions for direct charging of EVs. Rather EVs are charged by the power provided directly from the utility grid, usually via a special charger customers can purchase from the automaker or a third party that plugs into a conventional 120V or 240V wall outlet. Thus, there is a need for an integrated solar energy generation and storage system with efficient and cost effective EV charging capability.

BRIEF SUMMARY OF THE INVENTION

This disclosure describes various embodiments that relate to systems and apparatuses for cost effectively providing power to one or more home back-up loads, charging batteries of one or more electric vehicles, and channeling any excess power to the AC grid or to battery packs for backup and/or delayed consumption. The systems and apparatuses of the disclosure may include a renewable energy source (e.g. solar panels) coupled to an inverter. The inverter may include a bidirectional battery pack connection configured to supply energy to or receive energy from the battery packs, a bidirectional AC grid connection configured to supply or receive power from the AC grid, an output connection configured to supply power to a back-up load, and an electric vehicle connection configured to supply power to or receive power from an electric vehicle (EV). The systems and apparatuses of the disclosure may further include a control input terminal configured to receive instructions from a user or from a controller device to control the power flow within the inverter.

In accordance with the present disclosure, any excess energy generated by a renewable energy source can be stored in local battery packs or in an EV. In some embodiments, the battery packs can directly supply DC power to an EV. In other embodiments, energy stored in the EV can be used to supply to one or more back-up loads in the event of power outage. Embodiments of the present disclosure thus provide a flexible and efficient use of renewable energy and exploit the advance in EV battery technology.

In some embodiments, an inverter supplies any excess energy to one or more battery packs. In normal operating conditions, the inverter may channel the excess energy to the AC grid. In high power demand situations, the inverter may combine power from the AC grid, from the battery pack, and/or from a renewable energy source (e.g., solar panels on sunny days). In bad weather or needed conditions, the inverter may provide power to one or more back-up loads or to the EV from the battery packs. In a power outage event, the inverter may provide power to the back-up load from the battery packs or from the EV (e.g., when the battery packs are depleted). In other words, the EV battery can be used as a mobile emergency power source to backup home loads through the inverter.

In some embodiments, an inverter may include a battery pack connection for supplying energy to or receiving energy from a battery pack, an AC grid connection for supplying power to or receiving power from an AC grid, a connection for supplying power to a back-up load, an electric vehicle connection for supplying power to and receiving power from an electric vehicle (EV), and a control input configured to receive one or more control signals for controlling the flow of power within the inverter. The inverter, autonomously or under the control of the one or more control signals, inverts power received from the battery pack and provides the inverted power to charge a battery of the EV.

In one embodiment, the inverter is a storage inverter that further includes a DC/DC buck-boost stage configured to couple to the battery pack, and a DC/AC inverter configured to selectively couple to a grid-tied PV inverter, to the AC grid and to the home back-up load.

In one embodiment, the storage inverter includes a DC car port coupled to the DC/DC buck-boost stage and configured to supply DC power to or receive DC power from the battery of the EV.

In one embodiment, the inverter is a hybrid inverter that further includes a first DC/DC buck-boost stage configured to couple to one or more PV strings, and a DC/AC inverter configured to selectively couple to the AC grid, to the back-up load, and to the battery of the EV autonomously or under the control of the one or more control signals. The hybrid inverter may further include a second DC/DC buck-boost stage coupled between the first DC/DC buck-boost stage and the battery pack and configured to supply power to the battery pack or receive power from the battery pack.

In one embodiment, the hybrid inverter may further include a DC car port connection coupled to the second DC/DC buck-boost stage and configured to supply DC power to or receive DC power from the battery of the EV.

Some embodiments of the present invention also provide a system for energy conversion with electric vehicle charging capability. The system includes a photovoltaic (PV) inverter configured to receive DC power provided by a photovoltaic (PV) string and generate AC power, and a storage inverter coupled to the PV inverter. The storage inverter includes a battery pack connection for supplying energy to or receiving energy from a battery pack, an AC grid connection for supplying power to or receiving power from an AC grid, a connection for supplying power to a home back-up load, an electric vehicle connection for supplying power to or receiving power from an electric vehicle (EV) battery, and a controller for generating one or more control signals to control the flow of power through both the PV inverter and the storage inverter. The system, autonomously or under the control of the one or more control signals, converts power received from one of the PV string and the battery pack and provides the converted power to charge the EV battery.

Embodiments of the present invention also provide a system for energy conversion with electric vehicle charging capability. The system includes a hybrid inverter which contains a first DC/DC converter stage configured to receive power from a photovoltaic (PV) array, a capacitor bank coupled to the first DC/DC converter stage and configured to store DC energy, a DC-AC inverter coupled to the capacitor bank, a battery pack connection for supplying energy to or receiving energy from a battery pack, an AC grid connection for supplying power to or receiving power from an AC grid, a connection for supplying power to a home back-up load, and an electric vehicle connection for supplying power to or receiving power from an electric vehicle (EV) battery. The system also includes a controller for generating one or more control signals to control the flow of power within the hybrid inverter. The hybrid inverter, under the control of the one or more control signals, converts power received from the PV array and the battery pack and provides the converted power to charge the EV battery.

Other aspects and advantages of the invention will become apparent from the following detailed description taken in conjunction with accompanying drawings which illustrate, by way of example, the principles of the described embodiments.

BRIEF DESCRIPTION OF THE DRAWINGS

In order to facilitate a better understanding of the present disclosure, reference is now made to the accompanying drawings, in which like elements are referenced with like numerals. These drawings should not be construed as limiting the present disclosure, but are intended to be exemplary only.

DETAILED DESCRIPTION

According to embodiments described in this disclosure, an inverter for use in a renewable energy generation and storage system includes a bidirectional battery pack input for supplying energy to or receiving energy from a battery pack, a bidirectional grid connection for supplying power to or receiving power from the AC grid, an output connection for supplying power to a back-up load(s), an electric vehicle (EV) connection for supplying power to and receiving power from an EV, and a control input for receiving one or more control signals to control the direction of power flow within the inverter. In some variations, the electric vehicle connection is a bidirectional connection so that the EV may also supply power through the inverter. In other variations, the inverter is a storage inverter that further includes a DC/DC buck-boost stage configured to couple to a battery pack, and a DC/AC inverter stage configured to selectively couple to a PV inverter, to the AC grid and to the back-up load(s). In other variations, the EV connection may be an AC connection coupled to the DC/AC inverter stage, or a DC connection configured to couple to the battery pack. These and other variations described in this disclosure advantageously enable the solar energy generation and storage system to provide power to charge one or more EVs. The inverter may be configured to enable the EV battery to be charged by one or more of PV modules, battery pack and AC grid. The inverter may also be configured to allow the EV battery to supply power through the inverter to, for example, the home back-up load(s) when PV power and/or the AC grid are not available, or to the AC grid during peak demand hours. It is noted that while the various inverter and system embodiments described in this disclosure are in the context of solar energy systems, one skilled in this art would know how to modify the various inverter and system embodiments for use in other renewable systems such as fuel cell systems or wind energy generation systems in view of this disclosure.

Figure 1:
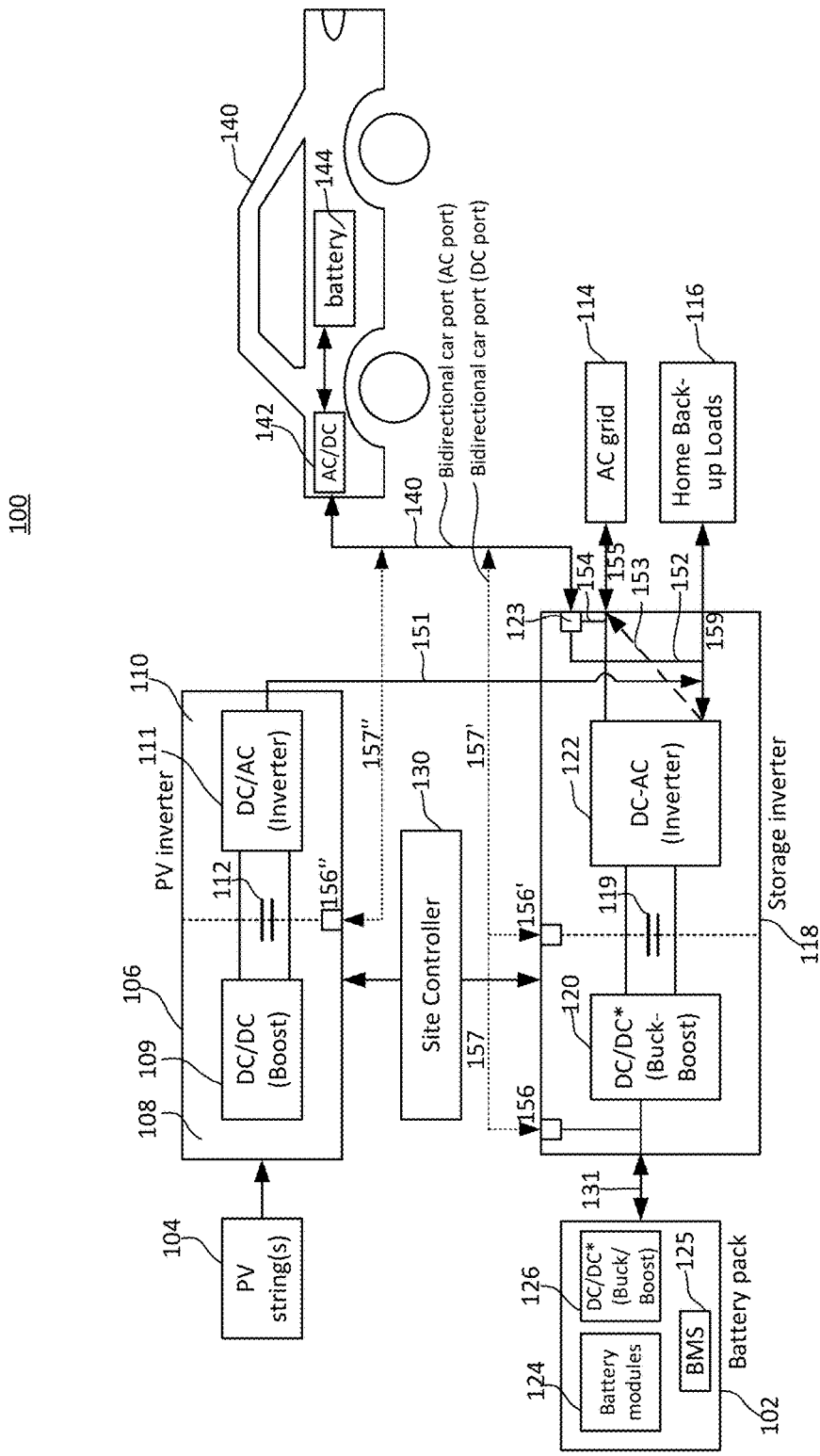
FIG. 1 is a block diagram of an exemplary AC coupled solar energy generation and storage system with electric vehicle charging capability, according to embodiments of the present disclosure.

FIG. 1 illustrates a block diagram of an exemplary solar energy generation and storage system 100 with electric vehicle charging capability. System 100 includes photovoltaic (PV) string(s) (or PV array) 104 connected to grid-tied PV inverter 106. The grid-tied PV inverter 106 includes DC side 108 and AC side 110 that are connected to one another via central capacitor bank 112. DC side 108 may include circuitry for performing maximum power point tracking (MPPT) on PV array, and DC/DC boost stage 109 for boosting or bypassing the string voltage provided by PV string(s) 104. AC side 110 converts the energy from capacitor bank 112 to AC current via DC/AC inverter 111 to supply to home backup loads 116 and AC grid 114. This typically involves synchronizing the voltage and phase of the PV inverter current/power to the AC grid interconnection or storage inverter voltage. The AC grid is not limited to single-phase but is also applicable to three-phase system, e.g., 120 Vac, 208 Vac, 230 Vac, 240 Vac, 277 Vac, 400 Vac, 480 Vac, 690 Vac, and the like. DC/AC inverter 111 may have an output configured to provide power to AC grid 114, or to power one of the home back-up loads 116 (e.g., refrigerator, washing machine, air conditioner, microwave oven, etc.) through storage inverter 118, and/or charge battery pack 102 through storage inverter 118 in an off-grid situation.

System 100 also has storage inverter 118 connected to a battery pack 102 including one or more battery modules (groups of cells) 124. This arrangement of the battery pack is called an AC-coupled system because the interface between storage inverter 118 and PV inverter 106 is an AC interface 151. System 100 is advantageous where, for example, the PV inverter already exists, and the user wants to add storage and EV charging capacity at later times as retrofit.

During battery pack charging, storage inverter 118 functions as a rectifier or performs switching converting the AC power into DC power for charging battery modules 124. The power for charging battery modules 124 may come from PV string(s) 104, from AC grid 114, or from both power sources combined or EV battery 144. Storage inverter 118 functions the same regardless of which power source(s) charge battery modules 124. Power may flow through DC/DC buck-boost stage 120, which steps the voltage down to the appropriate level for charging battery modules 124. The purpose of DC/DC buck-boost stage 120 is two-fold. One, to the extent necessary, it will buck the rectified DC voltage down to the level of battery modules 124. For example, if the rectified DC voltage exceeds battery modules' maximum allowable voltage, which it typically will since both AC grid 114 and PV inverter 106 provide at least 170 volts, it will buck that voltage down to a safe level of battery modules 124.

Second, during discharge of battery modules 124, power leaving battery modules 124 may again flow through DC/DC buck-boost stage 120 where it is stepped up to over or match grid voltage levels (e.g., 170 volts) before inversion to AC (by DC-AC inverter 122) for supply to AC grid 114 or back-up loads 116. A DC link (capacitor bank) 119 is disposed between DC/DC buck-boost stage 120 and DC-AC inverter 122. DC-AC (DC/AC) inverter 122 is a bidirectional inverter that can receive power from the AC grid and provide DC power to the battery pack.

In some embodiments, the function of DC/DC buck-boost stage 120 may be performed by DC/DC buck/boost stage 126 housed in battery pack 102. That is, either the DC/DC buck-boost stage is located in storage inverter 118 or in battery pack 102, or both sometimes. The asterisk "*" denotes the possible locations for the buck-boost stage: either at the storage inverter, at the battery pack, or at both. The amount of boost or buck that occurs will depend on the voltage level of battery pack 102. Battery pack 102 may also include a battery management system (BMS) 125 for management and control of battery modules 124. This concept is also applicable in non-PV systems that only have a storage inverter between the battery modules, the AC grid, and back-up load(s).

System 100 also includes electric vehicle charging capability. Electric vehicle (EV) 140 includes bidirectional AC/DC converter 142 that can be connected to AC car port 123 of storage inverter 118 via a charging cable and car plug. AC/DC converter 142 can receive AC power from storage inverter 118 that receives power from PV string(s) 104, from battery pack 102, or from both through car port 123. Alternatively, EV 140 can supply AC power via bidirectional AC/DC converter 142 and AC car port 123 to power back-up loads 116 (indicated by connection 152) or even to AC grid (indicated by connection 155). Car port 123 may also be connected to the AC grid through storage inverter 118 (indicated by connections 152, 153, 155), directly to the AC grid (indicated by connection 154), or with an external bypass mechanism.

System 100 may also include a DC car port 156 that enables a low-voltage DC charging of EV 140 when the EV battery 144 is a low-voltage battery (e.g. 48 V) and can be charged directly from the battery pack 102. DC car port 156 is a terminal connected between battery pack 102 and buck-boost stage 120. System 100 may also include a DC car port 156" that enables a high-voltage charging of EV 140 when the EV battery 144 is a high-voltage battery (e.g., 400V, 1000V). In this high-voltage EV charge scenario, the AC/DC conversion may be bypassed. DC car port 156' is a terminal connected at DC link 119 between buck-boost stage 120 and DC-AC inverter 122. The DC low-voltage connection for charging is denoted by reference numeral 157 and the DC high-voltage connection for charging the EV is denoted by reference numeral 157'. System 100 may also include a DC car port 156" that enables a high-voltage DC charging of EV 140 when PV string(s) 104 generates sufficient electric energy. DC car port 156" is a terminal connected to central capacitor bank 112 and configured to supply DC power to EV 140 through a bidirectional DC connection 157". For example, when PV string(s) 104 generates sufficient electrical power, the (high-voltage) battery 144 of EV 140 may be directly DC charged from DC/DC boost stage 109. When the PV string(s) is unable to provide adequate power, EV 140 may supply DC power to the PV inverter 106 through the DC car port connection 157" to power the home back-up load(s).

System 100 also includes site controller 130 configured to control the power flow within the system. For example, during on-grid, site controller 130 may cause storage inverter 118 to charge battery modules 124 from AC grid 114 (through connection 155) or from PV string(s) 104 (through connection 151). During off-grid, site controller 130 may cause storage inverter 118 to charge battery modules 124 from PV string(s) 104 (through connection 151) or supply power to AC grid (through connections 153, 155). Site controller may include multiple individual and distributed microcontrollers located in the PV inverter, in the battery pack, and in the storage inverter, the individual microcontrollers may communicate with each other through a controller bus (e.g., a controller area network bus or modbus or similar communication means) to handle the power flow within the system. Storage inverter 118 controls the power flow to the back-up loads via internal anti-islanding and transfer relays during on-grid and off-grid situations. Storage inverter 118 may have AC car port 123 for charging EV 140 from battery pack 102 or from PV string(s) 104, or from both sources. It is noted that the anti-islanding relays (not shown) are present after the DC/AC stage in both inverters and before the transfer relays (not shown) in the storage inverter. Anti-islanding relays together with the transfer relays route power under the control of controller 130. For slow charging, the total charging power could be limited to the individual power ratings or the combination of both for fast charging. For example, the PV inverter may have a power rating equal to or less than 5 to 6 kW, and the storage inverter may have a power rating equal to or less than 6 kW, so that together they can supply power equal to or less than 6 kW or less than 12 kW when combined. Site controller 130 may be configured by a user to set the charging priority, i.e., whether to supply power from the PV inverter only, from the storage inverter only, or from both, and in which order. In instances where the power from PV inverter 106 and storage inverter 118 is not sufficient, or more power is required, additional power may be drawn from AC grid 114 to charge EV 140.

Figure 1A:
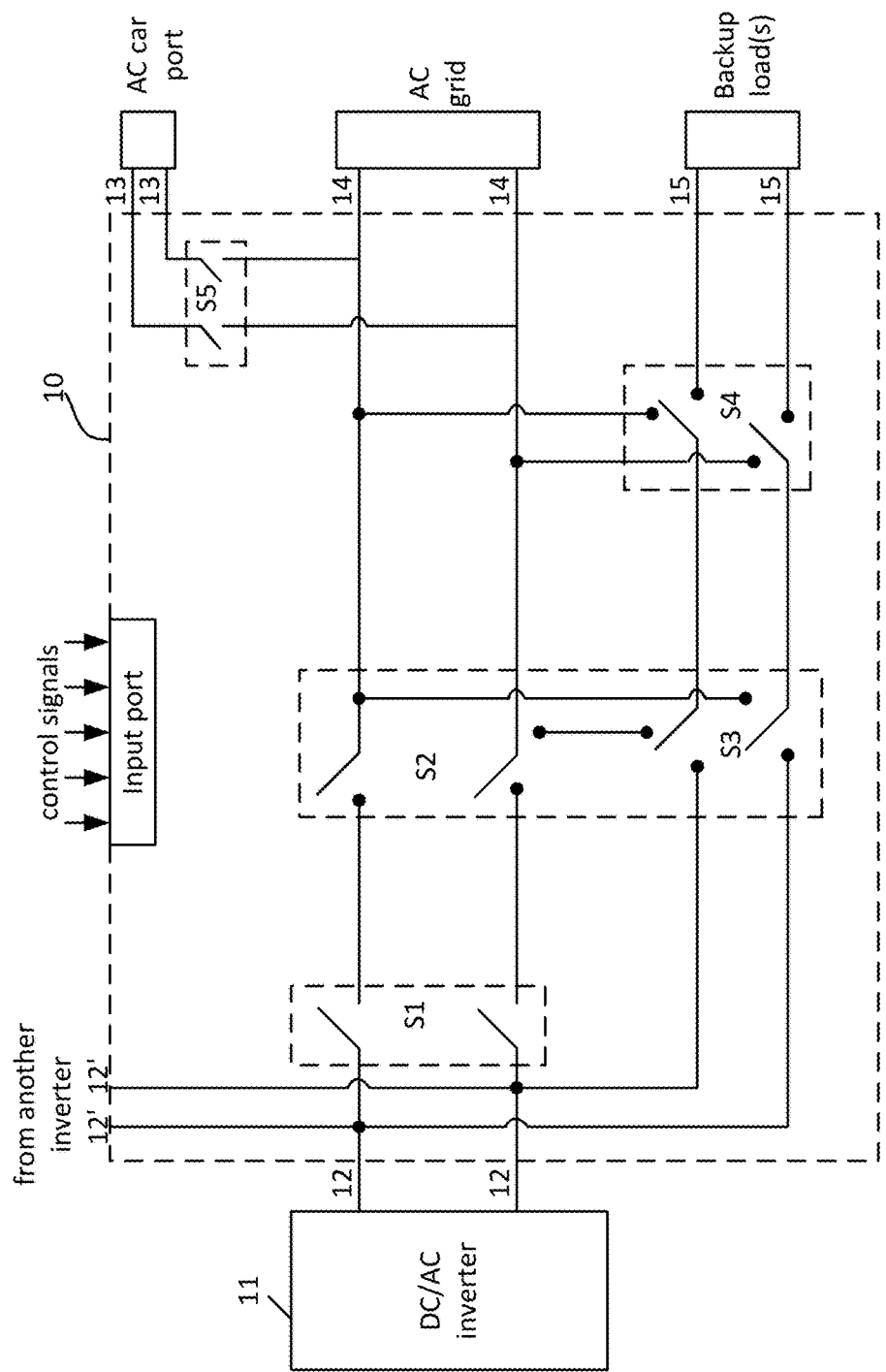
FIG. 1A is a connection diagram of an interconnection device providing multiple operation modes to a solar energy generation and storage system with electric vehicle charging capability, according to some embodiments of the present disclosure.

FIG. 1A is a connection diagram of an interconnection device (apparatus) 10 configured to support multiple operation modes of a solar energy generation and storage system according to some embodiments of the present disclosure. Connection device 10 includes a plurality of connections, each of which may include one or more switches (e.g., solid-state relays, electronic switches, electro-mechanical relays). In some embodiments, connection device 10 may have a multitude of switches disposed between the inverter (e.g., PV inverter, storage inverter) and backup load(s), between the backup load(s) and the AC grid, between the AC car port and the AC grid or the backup load(s), etc. Connection device 10 is configured to selectively connect backup load(s), the AC grid, the inverter, and the AC car port with each other under the control of a controller (e.g., the site controller 130).

Referring to FIG. 1A, connection device 10 may include a first terminal 12 for connecting to a DC/AC inverter 11. DC/AC inverter 11 may be the DC/AC inverter 122 or storage inverter 118 of FIG. 1. Connection device 10 further includes a second terminal 12' configured to establish electrical connection to another inverter, such as DC/AC inverter 111 of PV inverter 106 (FIG. 1). Connection device 10 also includes a third terminal 13 configured to establish a connection to an external EV, a fourth terminal 14 configured to establish a connection to the AC grid, and a fifth terminal 15 configured to establish a connection to home backup loads. The first, second, third, fourth and fifth terminals are selectively connected to each other through a plurality of switches, e.g., S1, S2, S3, S4, S5, which are controlled by control signals provided by a controller. Single-pole single-throw (SPST), single-pole double-throw (SPDT), double-pole double-throw (DPDT) or any suitable configuration can be used for switches S1, S2, S3, S4, S5. In some embodiments, the connection device can be located inside the storage inverter.

First terminal 12 and third terminal 13 are electrically and mechanically connected to each other through switches S1, S3 and S5. First terminal 12 (and second terminal 12') and fourth terminal 14 are electrically and mechanically connected to each other through switches S1 and S3. First terminal 12 and fifth terminal 15 are electrically and mechanically connected to each other through switches S3 and S4. Connection device 10 may further include an input port configured to receive control signals generated by a controller (e.g., site controller 130). The controller may issue control signals to selectively open or close the switches based on the performance of the solar energy generation and storage system (e.g., system 100 of FIG. 1). For example, the controller monitors the AC grid. If the voltage of the AC grid drops below a predetermined value, the controller may activate switches S3 and S4 in the manner that power to the backup load(s) is supplied by the DC/AC inverter instead by the AC grid. The controller may also activate switches S1, S2, S3, S4 to supply power to the backup loads(s) and to the AC grid when it determines that the battery modules in the battery pack are fully charged and there is excess energy available from the PV strings. The controller may further activate (close) switch S5 if it determines that an EV battery is connected to terminal 13 to charge the EV battery.

In some embodiments, the controller may detect an islanding condition and activate (open) switch S1 to electrically disconnect the output of the DC/AC inverter from the AC grid. In some embodiments, switch S1 may be an anti-islanding relay that includes logic to detect the islanding condition and automatically disconnect the DC/AC inverter from the AC grid and connect the DC/AC inverter to a synchronization mechanism (e.g., a phase-locked loop) to maintain the phase and frequency of the DC/AC inverter output.

In some embodiments, switches S2 and S3 may be a transfer relay that may include logic that directs the power flow from one power supply to another. For example, switches S2 and S3 may be open so that power of PV string(s) 104 can flow through the DC/AC inverter to charge battery modules 124 when the battery pack is not fully charged or depleted. For example, switch S3 may establish an electrical connection between the DC/AC inverter and the AC grid to supply power to the AC grid to get some credit when system 100 has surplus energy (a sunny day and the battery pack is fully charged). For example, a connection can be established through switches S3 and S4 so that the DC/AC converter can supply power to the backup load(s) when the AC grid is not available.

In some embodiments, switch S5 may have logic that activates (opens) the connection to terminal 13 in the event that a fault (e.g., a short circuit) in an EV battery is detected. In some embodiments, one or more of the switches may include logic to automatically open and close their contacts in the event a fault is detected and communicate the operational states to a central controller. In some embodiments, connection device 10 may be entirely or partially located in a circuit breaker box or panel or in any of the inverters. For example, terminal 15 may be connected to a circuit breaker panel to which the home backup loads are connected.

Figure 2:
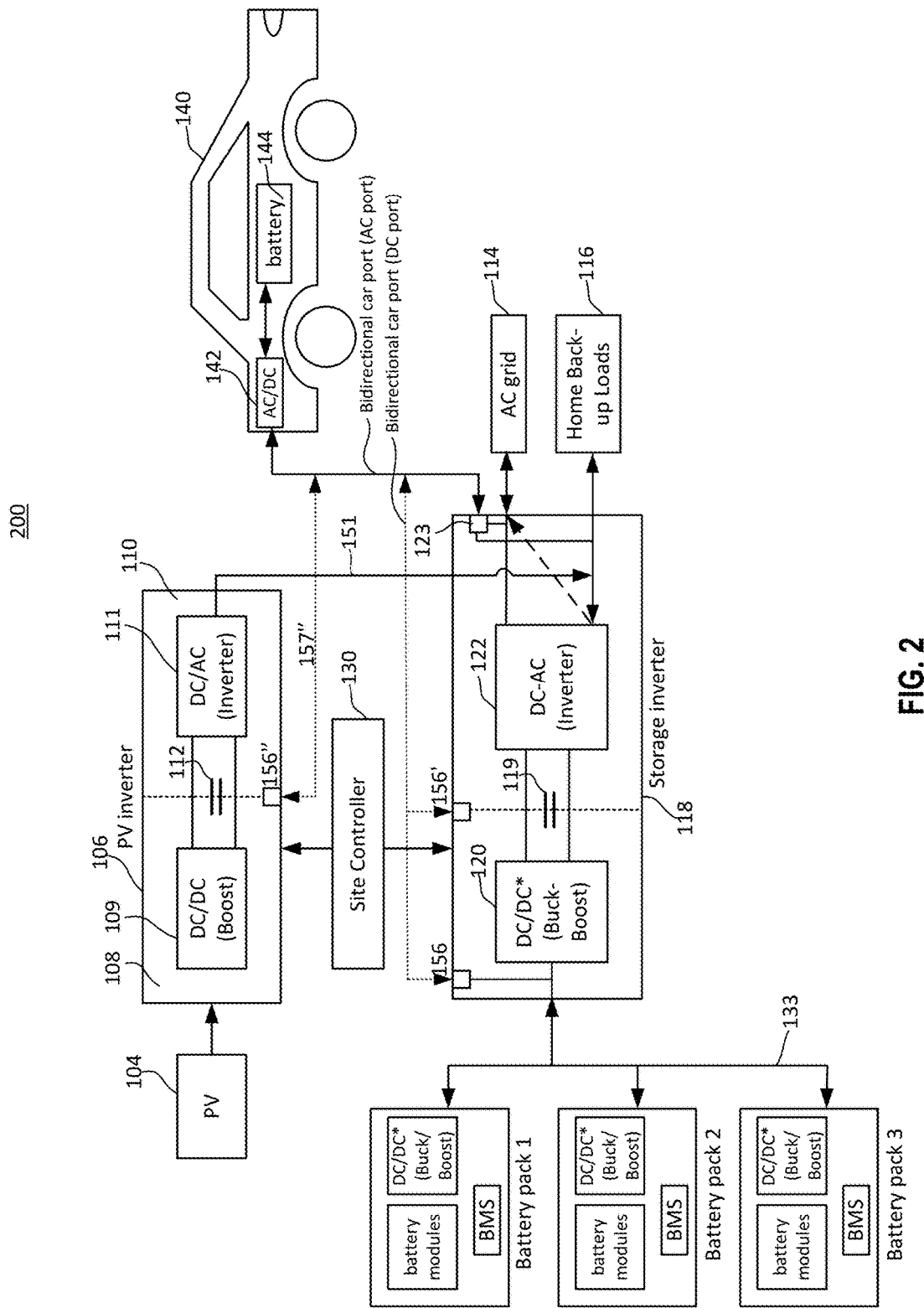
FIG. 2 is a block diagram of an exemplary AC coupled solar energy generation and storage system with multiple battery packs and electric vehicle charging capability, according to other embodiments of the present disclosure.

FIG. 2 illustrates a block diagram of an exemplary solar energy generation and storage system 200 with multiple battery packs and electric vehicle charging capability, according to some embodiments of the present disclosure. System 200 is similar to system 100 except that the backup energy capacity is increased to match or to be proportional to the capacity of EV battery 144. FIG. 2 shows three (3) battery packs provided for added capacity, however fewer or more battery packs may be used depending on the battery capacity of EV 140 and other factors. For example, each of the three battery packs may have an energy capacity of 10 kWh, and battery 144 of EV 140 may have a capacity of 30 kWh, so that the three battery packs (battery packs 1 through 3) together match the battery capacity of EV 140.

Other options may be to increase the power by using a larger size storage inverter, and/or a larger size PV inverter, or use multiple storage inverters and multiple PV inverters. Higher energy capacity and higher power capacity may be particularly useful in residential and commercial (car ports) applications for fast charging or charging multiple EVs. In some embodiments, the power output rating of storage inverter 118 can be greater than that of PV inverter 106. For example, PV inverter 106 may have a rated power output equal to or less than 6 kW, and storage inverter 118 may have a rated power output equal to or less than 12 kW or 18 kW, so that storage inverter 118 can supply additional power from more battery packs for fast charging the EV.

Figure 3:
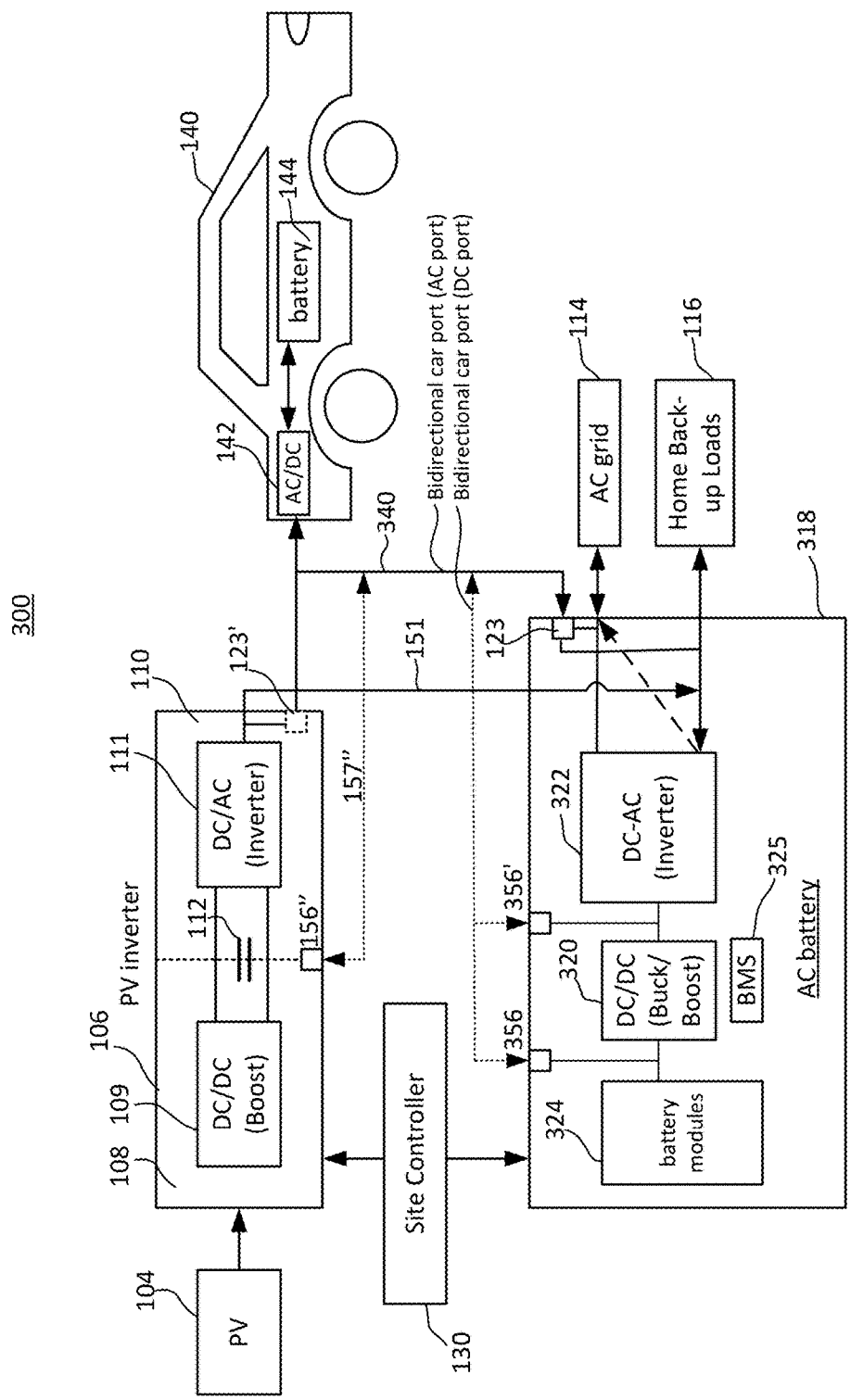
FIG. 3 is a block diagram of an exemplary AC coupled solar energy generation and storage system with AC battery and electric vehicle charging capability, according to other embodiments of the present disclosure.

FIG. 3 illustrates a block diagram of an exemplary AC coupled solar energy generation and storage system 300 with an AC battery configuration and EV charging capability, according to yet other embodiments of the present disclosure. In the embodiment shown, the battery pack is integrated with the storage inverter in the same chassis as a storage unit 318. This configuration is generally denoted as an "AC battery." AC battery 318 may include battery module 324, DC/DC buck/boost stage 320, bidirectional DC/AC (DC-AC) inverter 322, and battery management system (BMS) 325. Depending on the voltage level of the battery module, DC/DC buck/boost stage 320 may or may not be required. Battery module 324 may be a standard voltage battery pack (e.g., 48 V) or high voltage battery pack (e.g., 100 V or above). When battery module 324 is a high voltage pack, DC/DC buck/boost stage 320 may be omitted. Examples of high voltage battery packs have been described in U.S. application Ser. No. 14/931,648, filed Nov. 3, 2015, entitled "High Efficiency High Voltage Battery Pack for Onsite Power Generation Systems," the content of which is incorporated herein by reference in its entirety.

In some embodiments, when PV string(s) 104 do not generate energy and/or AC grid 114 is not available, AC battery 318 may supply energy to home backup loads 116 using the energy stored in battery modules 324. In other embodiments, battery 144 of EV 140 may be used to power home backup loads 116 via the bidirectional car port link 340 and AC car-port 123 through DC/AC (DC-AC) inverter 322. DC-AC inverter 322 is a bidirectional inverter. In yet other embodiments, PV inverter 106 may also include an AC car port 123' and operate in both grid-tied and off-grid (grid outage) situations, where the charging power entirely depends from the amount of solar energy available.

Figure 4:
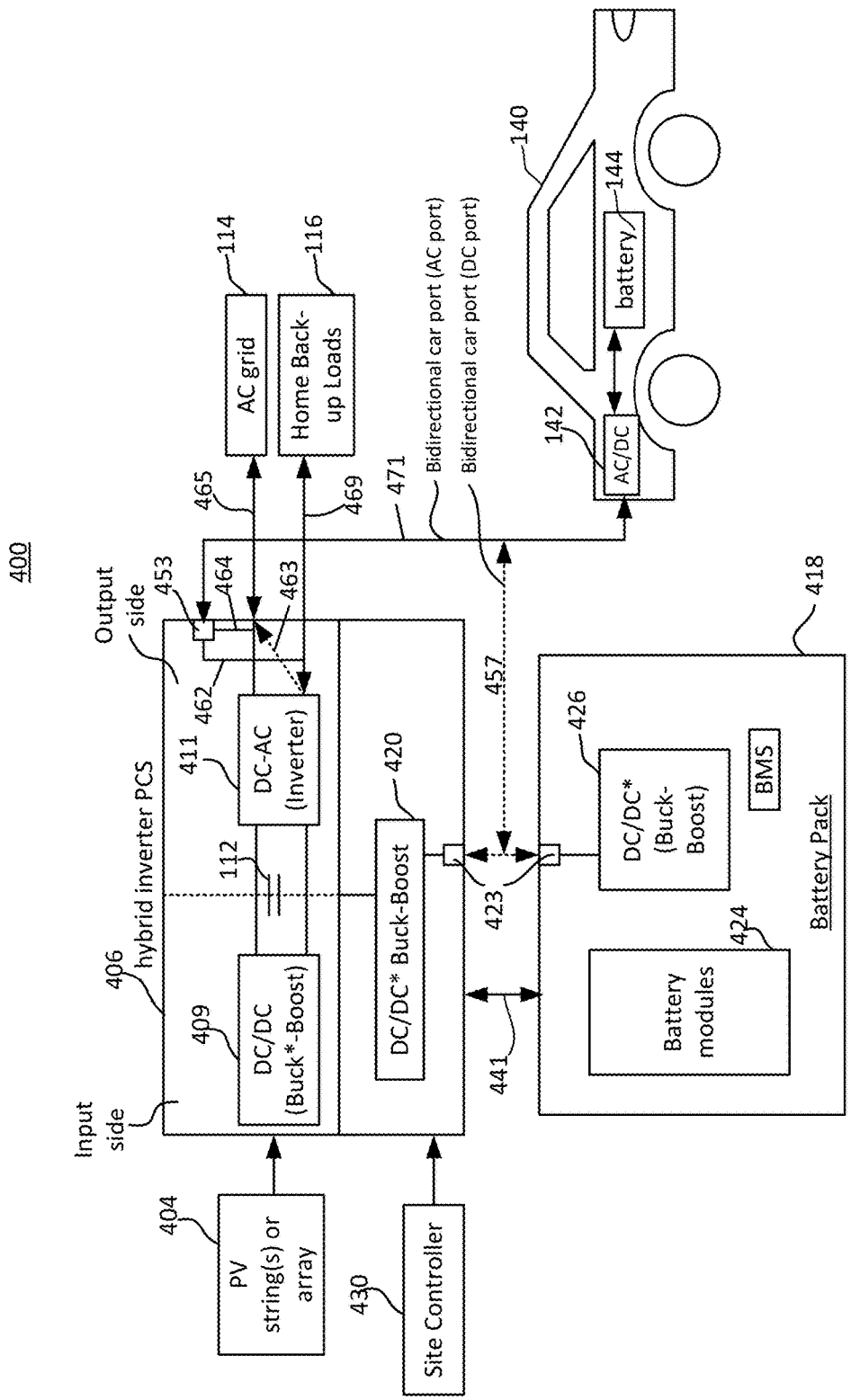
FIG. 4 is a block diagram of an exemplary DC coupled solar energy generation and storage system with electric vehicle charging capability, according to still other embodiments of the present disclosure.

FIG. 4 illustrates a block diagram of an exemplary solar energy generation and storage system 400 with electric vehicle charging capability according to still other embodiments of the present disclosure. System 400 differs from systems 100 and 200 in that the storage inverter is not required. System 400 also differs from system 300 in that DC/AC (DC-AC) inverter 322 in the AC battery is not required. In system 400, photovoltaic (PV) string(s) (or PV array) 404 is one of the inputs to hybrid inverter power control system (PCS) 406. PV string(s) (PV array) 404 may include multiple PV panels connected serially with an additive direct current (DC) voltage in the range between 100 volts and 1000 volts depending on the number of panels, their efficiency, their output rating, ambient temperature and solar irradiation on each panel. In some embodiments, when the high voltage DC line from each PV string is input to hybrid inverter PCS 406, it is subjected to maximum power-point tracking (MPPT) at the string level. Alternatively, a number of modules in a respective string may include a DC optimizer that performs MPPT at the module level, rather at the string level.

Hybrid inverter PCS 406 may include a DC/DC buck and/or boost converter 409 at the inverter PV input side. DC/DC converter 409 is configured to ensure that the voltage supplied to DC/AC inverter 411 is sufficiently high for inversion. Hybrid inverter PCS 406 also includes a central DC bus (capacitor bank) 441 attached to a battery pack 418 so that the DC power coming from PV string(s) 404 can be used to deliver DC power to battery pack 418 to charge battery modules 424. This arrangement of the battery pack is called a DC-coupled system because the interface between hybrid inverter PCS 406 and battery pack 418 is a DC bus 441. Battery pack 418 has a minimum and maximum associated operating voltage range. Because battery pack 418 has a maximum exposed input voltage limit that, in many cases, is lower than the theoretical maximum DC voltage coming off of the PV string(s). Some embodiments include a DC/DC buck-boost stage 420 between the central capacitor bank 112 and high voltage battery pack 418. The inclusion of DC/DC buck-boost stage 420 will prevent voltages above a safe threshold from being exposed to high voltage battery pack 418, thereby eliminating the possibility of damage to high voltage battery pack 418 from overvoltage stress. Alternatively, the function of DC/DC buck-boost stage 420 may be located in high voltage battery pack 418. The inclusion of an asterisk denotes that the DC/DC buck-boost stage can be located either in the hybrid inverter PCS (shown by block 420) or in the high voltage battery pack (shown by block 426) or in both systems. In some embodiments, if the DC/DC converter 409 also includes a buck stage in addition to the boost stage then the DC/DC buck-boost stage 420 may not be necessary. In some embodiments, when there are PV optimizers under modules for DC/DC conversion, then there may not be a need for DC/DC converter 409 and/or 420. Battery pack 418 includes battery modules 424 that may include low voltage battery modules (e.g., 48 V) or high voltage battery modules (e.g., greater than 100 V). In the case that battery modules 424 have low voltage battery modules, DC/DC buck-boost converter 426 may boost the voltage to a higher voltage level for charging high voltage battery 144 of EV 140.

When PV string(s) 404 generate energy, that energy can be supplied: (1) to charge high voltage battery pack 418 through DC/DC buck-boost stage 420 (or 426) via DC car port 423, or (2) to charge battery 144 in EV 140 through DC/AC inverter 411 and AC car port 453, or (3) to power home backup loads 116 through DC/AC inverter 411, or (4) to AC grid 114 through DC/AC inverter 411. When PV string(s) 404 do not generate energy and/or AC grid is not available, energy can be provided by battery pack 418: (1) to power home backup loads 116 through DC/DC buck-boost 420 (or 426) and DC/AC converter 411, or (2) to charge EV battery 144 in EV 140 through the central DC bus 441 and DC car port 423 or (3) to AC grid 114 through DC/DC Buck-Boost 426 (or 420) and DC/AC inverter 411. When PV string(s) (PV array) 404 do not generate energy and AC grid is not available, EV battery 144 may be used to power back-up loads 116 via AC car port 453 or via DC car port 423 through hybrid inverter PCS 406. Thus, system 400 has a bidirectional AC car port connection 471 denoted "Bidirectional car port (AC port)" in FIG. 4 and bidirectional DC car port connection 457 denoted "Bidirectional car port (DC port)" in FIG. 4. Hybrid inverter PCS 406 controls the power flow to the back-up loads via internal anti-islanding and transfer relays during on-grid and off-grid situations.

Referring to FIG. 4, EV 140 may have an internal AC/DC converter 142 for power conversion in case of AC port 453 supplying power to EV battery 144 through AC car port connection 471. AC/DC converter 142 may be bypassed when DC car port 423 supplies DC power directly to EV battery 144 through DC car port connection 457. DC port 423 is particularly advantageous in that it can provide higher power (combination of PV string(s) and high voltage battery pack), and high voltage direct charging improves charging efficiency, similar to superchargers currently available in the market.

In some embodiments, system 400 may include a site controller 430 configured to automatically select among one or more of the PV string(s), the battery pack, the EV battery, and the AC grid to provide power to the home backup loads. Site controller 430 may further be configured by a user to set the EV battery charging priority, i.e., whether to supply power from the PV string(s) only, from the battery pack only, or from both, and in which order. In instances where the energy from the PV string(s) and the battery pack is not sufficient, or more energy/power is required, additional energy may be drawn from AC grid 114 to charge EV 140.

In some exemplary embodiments, system 400 may receive commands from the site controller to charge the battery pack using energy generated by the PV string(s) through the DC/DC buck-boost stage and DC bus 441. In some exemplary embodiments, system 400 may receive commands from the site controller to charge the EV battery using energy generated by the PV string(s) or energy stored in the battery pack through the DC/AC inverter, AC car port 453, and bidirectional AC car port 471. In some exemplary embodiments, system 400 may receive commands from the site controller to charge the EV battery using energy stored in the battery pack through the DC car port 423 and the bidirectional DC car port 457. In some exemplary embodiments, system 400 may receive commands from the site controller to power home backup loads through DC/AC inverters 411 and interface 469 and/or provide surplus power to the AC grid through DC/AC inverters 411 and interface 465.

In some exemplary embodiments, when the PV string(s) do not generate energy and/or the AC grid is not available, site controller 430 may instruct system 400 to provide energy stored in the battery pack to the backup loads through the DC/DC buck-boost 420 (or 426) and DC/AC inverter 411 and interface 469. In some exemplary embodiments, when the PV string(s) do not generate energy, the AC grid is not available, and the battery pack is either not available or depleted, the battery 144 of EV 140 can provide energy to the home backup loads through the directional AC/DC inverter 142 and bidirectional car port 471. EV 140 can also provide energy to the AC grid through bidirectional car port 471, AC car port 453, the connection 462 and DC/AC inverter 411. In some exemplary embodiments, when the PV string(s) do not generate energy and the battery pack is not available, battery 144 of EV 140 can be charged by the AC grid through connection 465, AC car port 453, and bidirectional car port 471.

In some embodiments, a connection device similar to connection device 10 shown in FIG. 1A and described above may be used to connect DC/AC inverter 411 to the EV, the AC grid, and the home backup loads.

For slow charging, the total charging power can be limited to the inverter power rating or the combination of both the PV string(s) and the battery pack in case of the DC car port. For example, the PV string(s) may generate equal to or less than 6 kW and the battery pack may generate equal to or less than 6 kW, so that the charging power is equal to or less than 6 kW when one of PV string(s) and battery pack is used, or equal to or less than 12 kW when combined.

In some cases, when the power from the PV string(s) and/or from the battery pack are not sufficient, or more power is required, then site controller 430 may direct system 400 to receive power from the AC grid. In some embodiments, site controller 430 may be a central controller that connects to the hybrid inverter PCS to control the power flow of the hybrid inverter PCS and the battery pack. In some other embodiments, site controller 430 may include multiple microcontrollers distributed in DC/DC buck-boost stage 409, in DC/AC inverter 411, in DC/DC buck-boost stage 420, and in battery pack 418, each of the microcontrollers monitors and controls the performance of the system (s) they reside in. The microcontrollers may communicate with each other through a controller bus, e.g., a controller area network (CAN) bus and the like.

Figure 5:
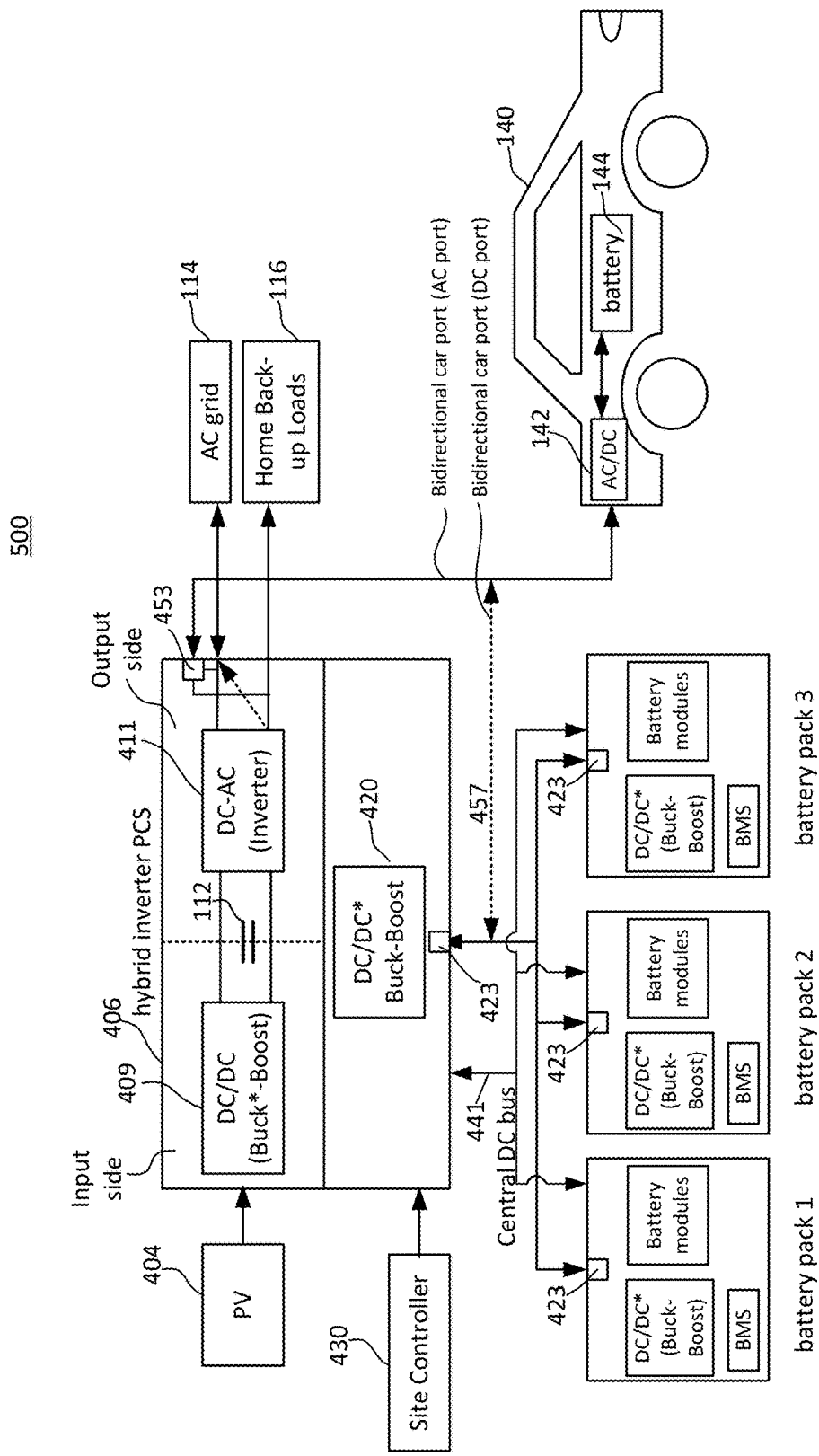
FIG. 5 is a block diagram of an exemplary DC coupled solar energy generation and storage system with multiple battery packs and electric vehicle charging capability, according to still other embodiments of the present disclosure.

FIG. 5 illustrates a block diagram of an exemplary solar energy generation and storage system 500 with EV charging capability, according to other embodiments of the present disclosure. System 500 is similar to system 400 except that the backup energy capacity is increased/multiplied to match or be proportional to the capacity of EV battery 144. FIG. 5 shows three battery packs connected in parallel through a central DC bus to provide greater energy capacity, however fewer or more battery packs may be used depending on the battery size of EV 140 and other factors.

The power supplied by energy generation and storage system 500 can be increased in a number of ways. For example, a bigger DC/AC inverter stage may be used, a bigger DC/DC buck-boost stage may be used, and/or multiple parallel-connected hybrid inverters may be used, or any combination thereof. In some cases, large capacity and high power hybrid inverters having multiple car ports (AC ports or DC ports or both) are essential in residential and commercial applications for simultaneously charging multiple EVs. In some embodiments, when the AC or DC car port on storage inverter 1 is being utilized, once the energy in system 1 is depleted, then the energy from storage inverter 2 through X can be retrieved through the storage inverter 1 car port, as all of the these systems are electrically interconnected and can operate in conjunction.

In some embodiments, the PV string(s) may include a multitude of strings, each string may include a plurality of PV panels connected in series to produce relatively high DC voltage, e.g., in the range between 100 V to 1000 V. Each PV panel or PV string may include an optimizer configured to produce a fixed DC voltage to directly charge the high voltage battery pack or charge the EV battery. In other embodiments, micro-inverters may be used instead of PV inverters.

Figure 6:
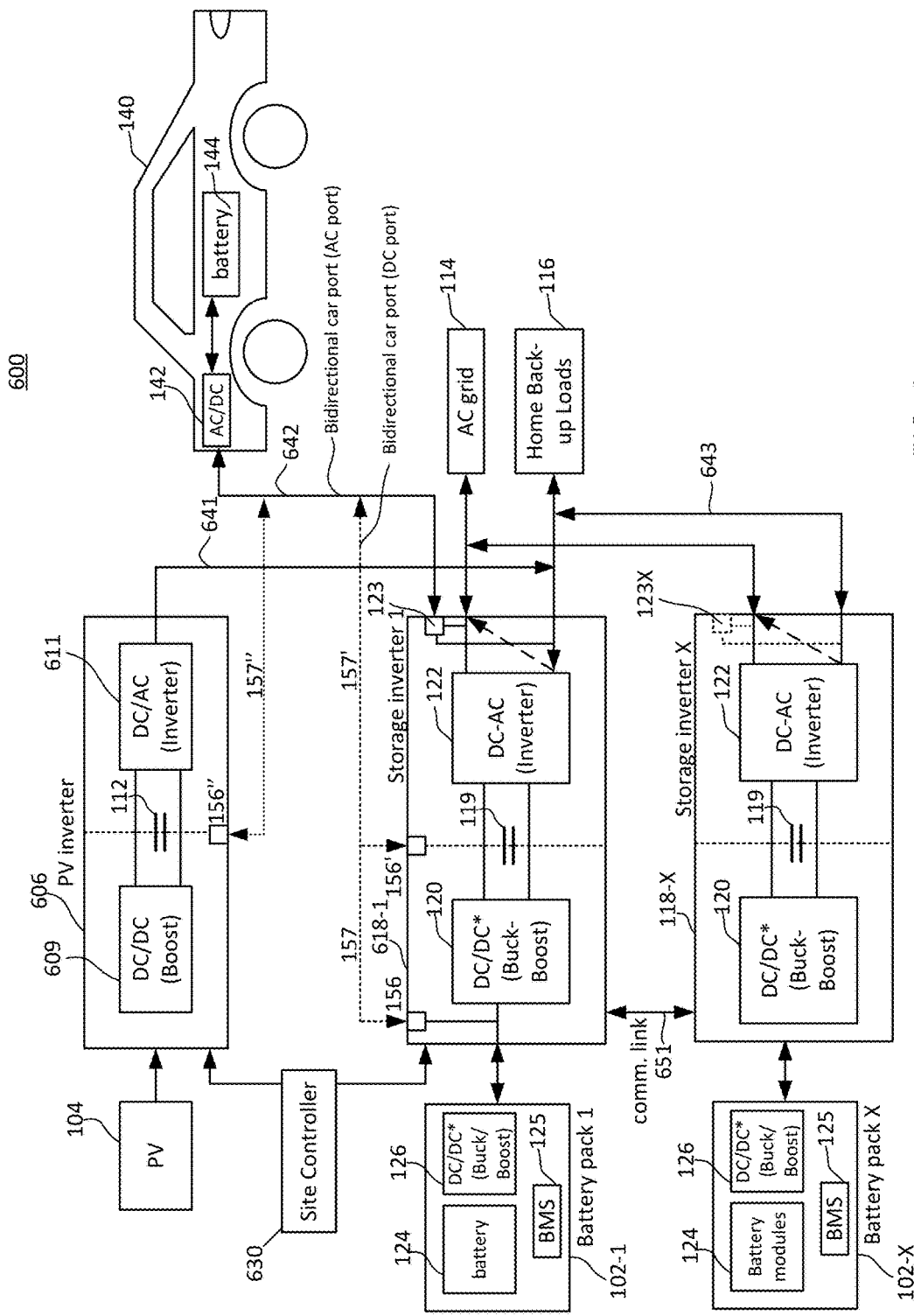
FIG. 6 is a block diagram of an exemplary AC coupled solar energy generation and storage system with electric vehicle charging capability including a PV inverter and multiple storage inverters and associated battery packs, according to still other embodiments of the present disclosure.

FIG. 6 illustrates a block diagram of an exemplary AC coupled solar energy generation and storage system 600 with electric vehicle charging capability including a PV inverter and multiple storage inverters, according to some embodiments of the present disclosure. System 600 includes PV inverter 606 having DC/DC boost converter 609 that converts the voltage received from PV string(s) 104 to a higher voltage level, DC/AC inverter 611 coupled to DC/DC converter 609 through capacitor bank 112. System 600 also includes a number of storage inverters 618-1 to 618-X. The letter "X" at the end of "618-X" represents an integer number. In some embodiments, PV inverter 606 and storage inverters 618-1 to 618-X may be similar to the above-described PV inverter 106 and storage inverter 118 shown in FIG. 1. System 600 has some advantages over systems 100 and 200 as it has more storage capacity (more charge capacity than system 100) and can provide more power (more power output than system 200).

PV inverter 606 provides energy to home backup loads 116 and AC grid 114 through connection 641. PV inverter 606 also provides energy to battery 144 of EV 140 through car port 123 and bidirectional AC port 642. When PV string(s) 104 does not generate energy, storage inverters 618-1, 618-X may take over using the respective battery pack 102-1, 102-X. Site Controller 630 is configured to control the energy flow either automatically or per user's commands. It is noted that, although one battery pack 1 and one battery pack X are shown, it is, however, understood, that battery pack 1 and/or battery pack X can have multiple battery packs. System 600 also includes communication line 651 connecting the storage inverters. Communication link 651 can be a wired connection line or a wireless communication link that enables the communication between the storage inverters. If there is low energy in any battery connected to the storage inverter, the other storage inverters can be used. For example, storage inverter 618-1 can take the energy/power from storage inverter 618-X via the AC bidirectional port 643. In some embodiments, storage inverter 618-X may have a car port 123X that is similar to car port 123 and may also be connected to the AC grid through storage inverter 618-X or with an external bypass mechanism.

Figure 7:
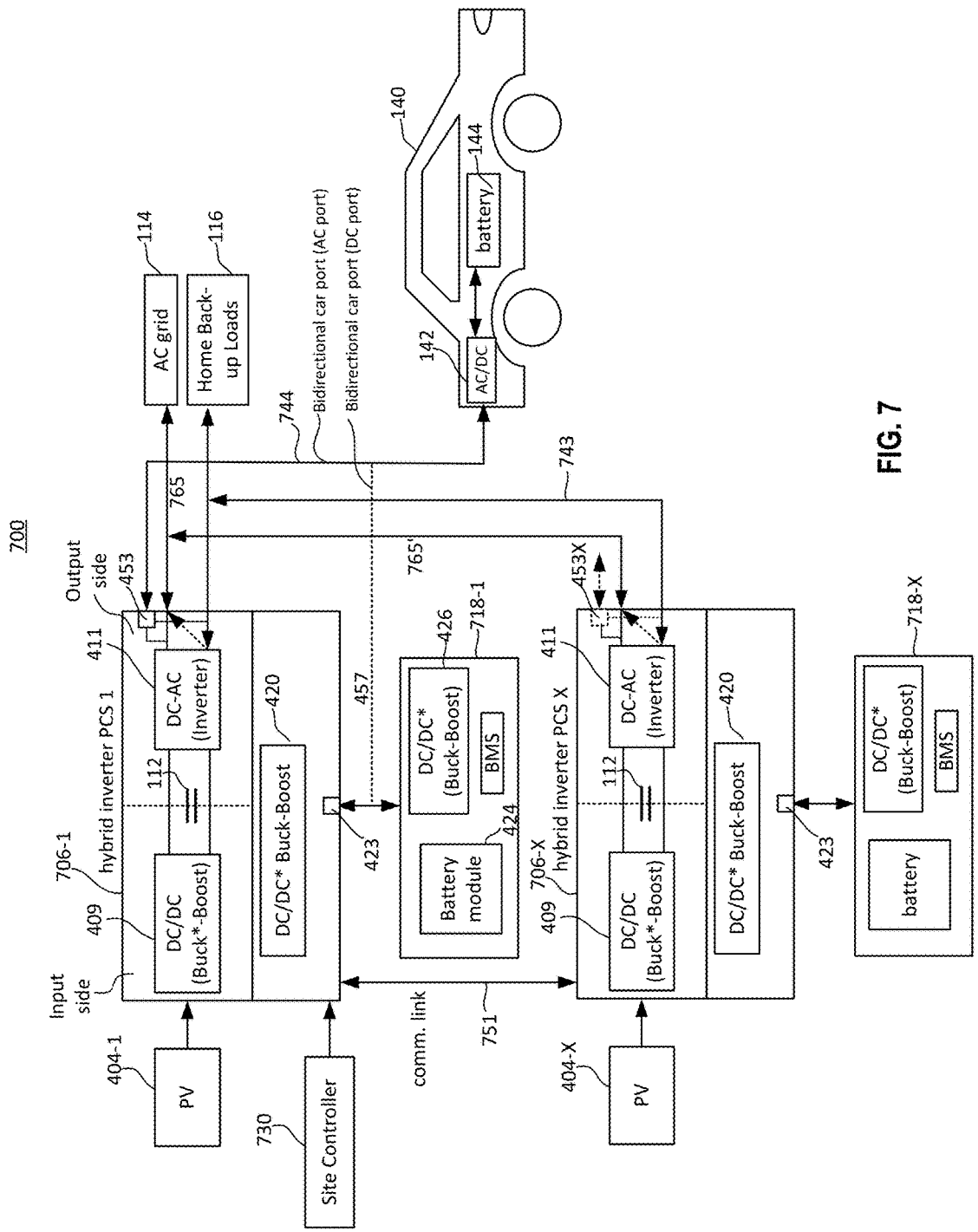
FIG. 7 is a block diagram of an exemplary DC coupled solar energy generation and storage system with electric vehicle charging capability including multiple hybrid inverters and associated battery packs, according to still other embodiments of the present disclosure.

FIG. 7 illustrates a block diagram of an exemplary DC coupled solar energy generation and storage system 700 with electric vehicle charging capability including multiple hybrid inverters and battery packs, according to still other embodiments of the present disclosure. System 700 includes a number of hybrid inverter power control systems (PCSs) connected in parallel. In some embodiments, each of the hybrid inverter PCS may be similar or the same as hybrid inverter PCS 406 of FIG. 4 described above. System 700 has a number of advantages over system 400 as it can provide more output power (more output power than system 400) because it has a number of hybrid inverter PCSs connected in parallel, and each of the hybrid inverter PCSs has it own battery pack, so that system 700 also has a higher storage capacity that that of system 400. In the example shown in FIG. 7, two hybrid inverter PCSs 706-1 and 706-X are shown, but it is understood that the number is arbitrarily chosen for describing the example embodiment and should not be limiting. Accordingly, the reference number X can be any integer number N. Each of hybrid PCSs 706-1, 706-X is connected to a corresponding battery pack 718-1, 718-X (collectively referred to as battery pack 718). Battery pack 718 includes battery module 424 that may be a standard voltage battery pack (e.g., 12V/48V) or high voltage battery pack (e.g., 100V/400V). When battery module 424 is a high voltage pack, DC/DC buck/boost stage 420 may be omitted. An example of a high voltage battery pack has been described in U.S. application Ser. No. 14/931,648, filed Nov. 3, 2015, entitled "High Efficiency High Voltage Battery Pack for Onsite Power Generation Systems," the content of which is incorporated herein by reference in its entirety.

PV array 404 of FIG. 4 may include a plurality of separate PV strings. Each of the hybrid PCSs is connected to a corresponding PV string(s) (e.g., 404-1, 404-X, collectively referred to as PV string(s) 404 hereinafter). In some embodiments, when PV string(s) 404 generate energy, that energy can be supplied: (1) to charge battery pack 718 through DC/DC buck-boost stage 420 (or 426), or (2) to charge battery 144 in EV 140 through DC/AC inverter 411 and AC car port 453, or (3) to power home backup loads 116 through DC/AC inverter 411, or (4) to AC grid 114 through DC/AC inverter 411. When PV string(s) 404 do not or partially generate energy and/or AC grid 114 is not available, energy can be provided by battery pack 718: (1) to power home backup loads 116 through DC/DC buck-boost 420 (or 426) and DC/AC converter 411, or (2) to charge EV battery 144 in EV 140 through the central DC bus and DC car port 423 or (3) to AC grid 114 through DC/DC buck-boost 426 (or 420) and DC/AC inverter 411. When PV string(s) 404 do not generate energy and AC grid 114 is not available, EV battery 144 may be used to power home back-up loads 116 via AC car port 453 or via DC car port 423 through hybrid inverter PCS 706-1. Thus, system 700 has a bidirectional AC car port 453 denoted "Bidirectional car port (AC port)" in FIG. 7 and a bidirectional DC car port 423 denoted "Bidirectional car port (DC port)" in FIG. 7. The hybrid inverter PCSs can be communicated with each other through a communication link 751. Communication link 751 can be a wired connection line or a wireless communication link that enables the communication between the hybrid inverter PCSs. For example, hybrid inverter PCS 706-1 can take the energy/power from hybrid inverter PCS 706-X via an AC bidirectional port 743. In some embodiments, hybrid inverter PCS 706-X may have car port 453X that is similar to car port 453 and may also be connected to the AC grid. In some embodiments, when the AC or DC car port on hybrid inverter PCS 1 is being utilized, once the energy in system 1 is depleted, then the energy from hybrid inverter PCS 2 through X can be retrieved through the hybrid inverter PCS 1 car port, as all of the these systems are electrically interconnected and can operate in conjunction.

In some embodiments, system 700 may include a site controller 730 configured to automatically select among one or more of the PV string(s), the hybrid inverter PCSs, the EV battery, and the AC grid to provide power to the home backup loads. Site controller 730 may further be configured by a user to set the EV battery charging priority, i.e., whether to supply power from the PV string(s) only, from the battery pack only, or from both, and in which order. In instance where the energy from each of the PV string(s) and the battery pack is not sufficient, or more energy is required, energy can be drawn from all of the hybrid inverter PCSs of the system, or additional energy may also be drawn from AC grid 114 to charge EV 140. In some embodiments, when battery pack 718 does not have enough energy, battery 144 of EV 140 may be used to supply energy to home backup loads 116 through AC bidirectional car port 744 and DC/AC inverter 411.

Figure 8:
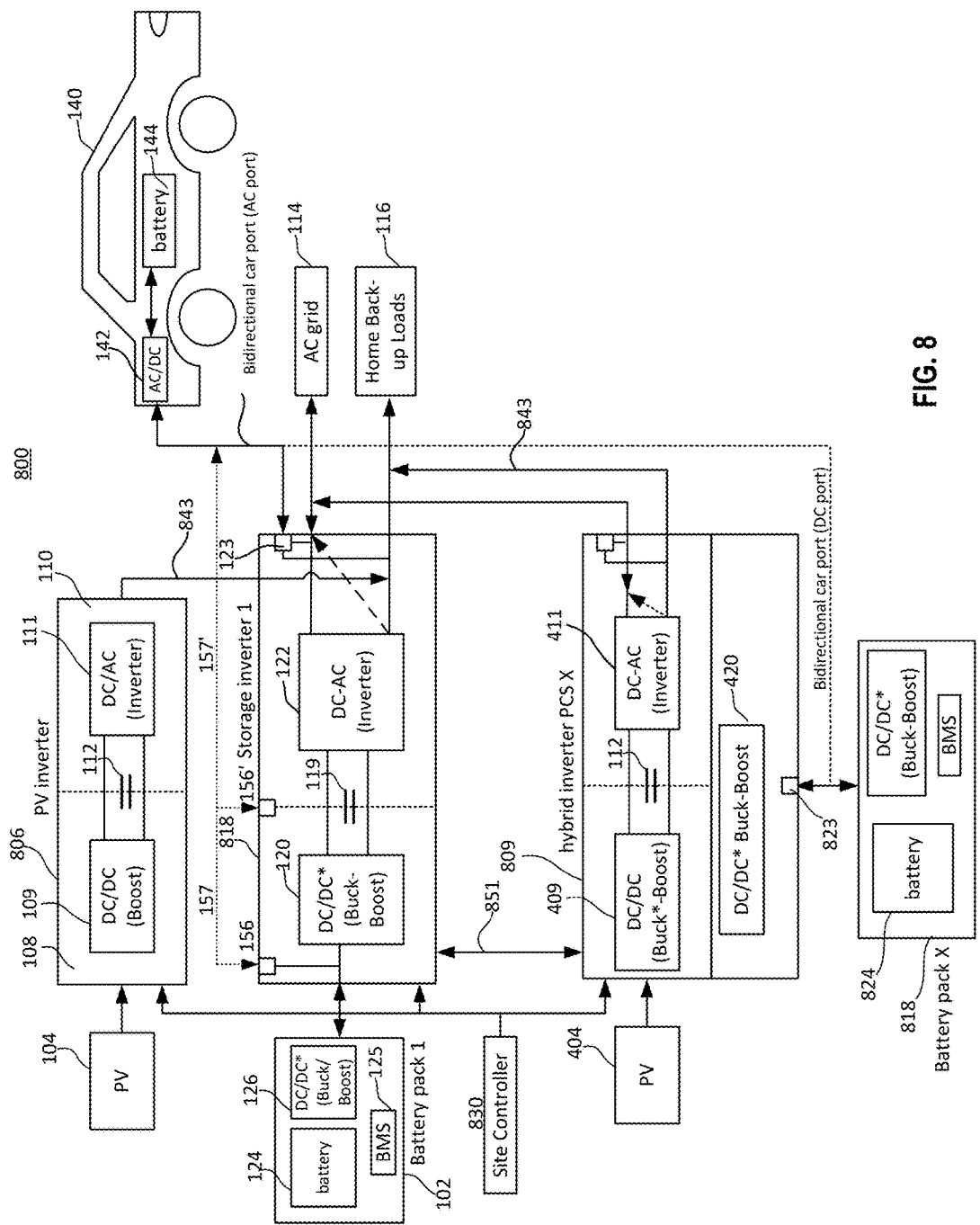
FIG. 8 is a block diagram of an exemplary solar energy generation and storage system with electric vehicle charging capability including an AC coupled solar energy generation and storage system and one or more hybrid inverters and associated battery packs, according to still other embodiments of the present disclosure.

FIG. 8 illustrates a block diagram of an exemplary solar energy generation and storage system 800 with electric vehicle charging capability including an AC coupled solar energy generation and storage system of FIG. 1 and one or more hybrid inverters and battery packs, according to still other embodiments of the present disclosure. System 800 allows users to add capacity and output power as needed. For example, a user can add one or more storage inverters to an already available PV inverter to meet the need of capacity increase. As additional capacity and output power are further required, the user may add one or more hybrid inverter PCSs to the already installed PV inverter and storage inverter based on advances in inverter technology.

Referring to FIG. 8, system 800 may include a PV inverter 806 AC-coupled to a storage inverter 818. PV inverter 806 and storage inverter 818 may be one of the AC-coupled systems of FIGS. 1, 2, and 3 described in above sections. System 800 also includes a hybrid inverter PCS 809 including a battery pack 818. Battery pack 818 includes a battery module 824 that may include a number of standard (low voltage) batteries (e.g., 12V to 48V) or high-voltage batteries (>100V). Hybrid inverter 809 together with battery pack 818 may be one of the DC-coupled system of FIGS. 4, 5, and 7 described in above sections. The AC coupled system and the DC coupled system can be are connected together through an AC bidirectional connection port 843 to provide a higher power to home backup loads 116 and/or AC grid 114. Although one hybrid inverter PCS is shown in system 800, it is, however, understood that system 800 can have any number of hybrid inverter PCSs. It is also understood that, although only one battery pack 1 and one battery pack X are shown, system 800 may have any number of battery packs 1 and any number of battery packs X. Although not shown in FIG. 8, it will be appreciated that PV inverter 806 may include a bidirectional DC car port 156" and bidirectional DC connection 157" for supplying DC power to EV 140 when PV string 104 generates sufficient electrical energy and for receiving DC power from EV 140 when PV string does not provide adequate electrical energy.

System 800 also includes a communication link 851 connecting storage inverter 818 (the AC coupled system) and hybrid inverter PCS 809 (DC coupled system). Communication link 851 can be a wired connection line or a wireless communication link that enables the communication between storage inverter 818 and hybrid inverter PCS 809. For example, storage inverter 818 can take the energy/power from hybrid inverter PCS 809 via an AC bidirectional port 843, or vice versa. In some embodiments, hybrid inverter PCS 809 may have a car port 823 for DC charging battery 144 of EV 140. In some embodiments, car port 123 can be in each inverter.

In some embodiments, system 800 may also include a site controller 830 configured to automatically select among the PV string(s), the PV inverter, the storage inverter, the hybrid inverter PCS, the EV battery, and the AC grid to provide power to the home backup loads. Site controller 830 may further be configured by a user to set the EV battery charging priority, i.e., whether to supply power from the PV string(s) only, from the battery pack(s) (e.g., 102, 818) only, or from both, and in which order.

Figure 9:
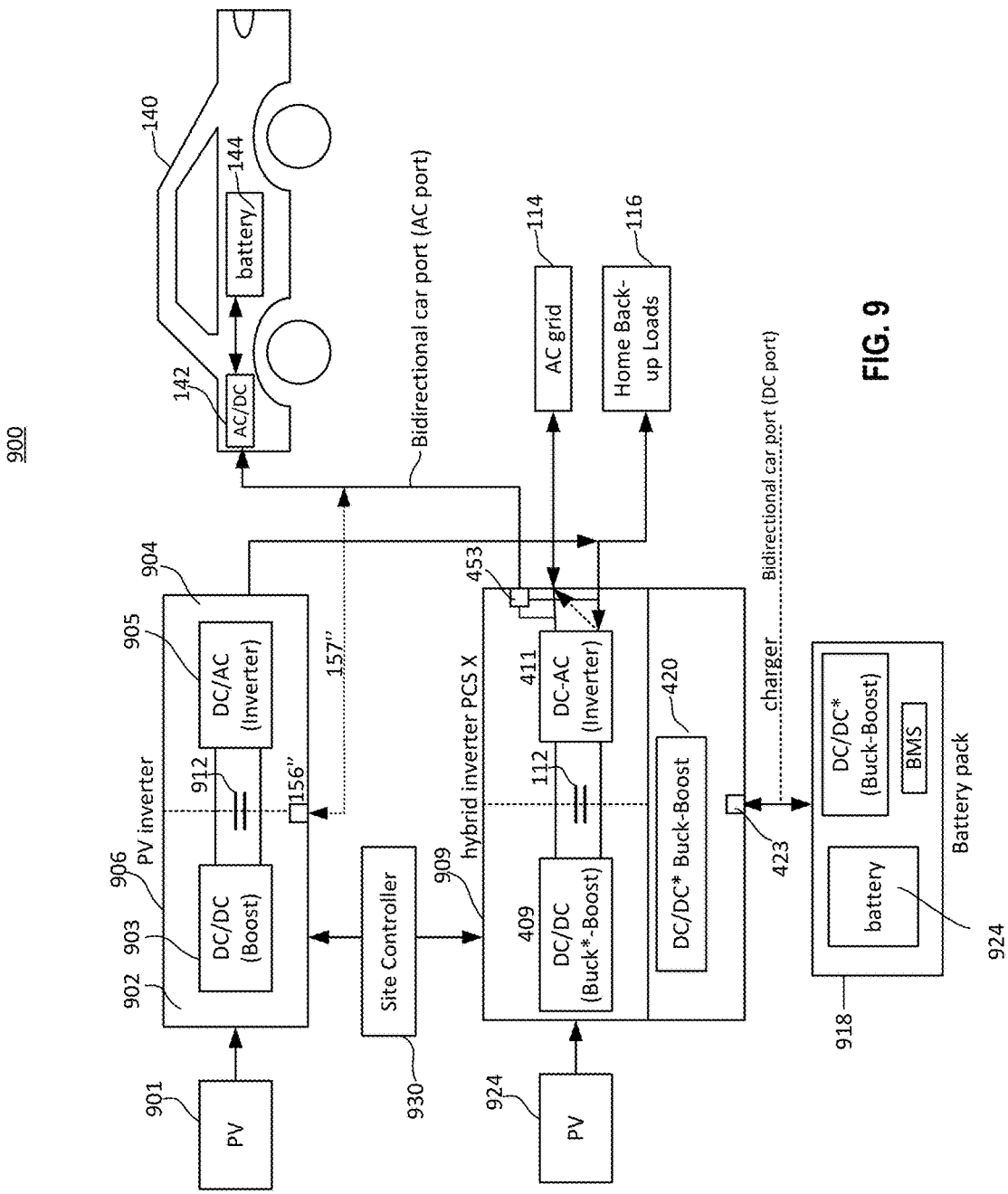
FIG. 9 illustrates a block diagram of an exemplary solar energy generation and storage system with electric vehicle charging capability including a PV inverter and one or more hybrid inverters and associated battery packs, according to still other embodiments of the present disclosure.

FIG. 9 illustrates a block diagram of an exemplary solar energy generation and storage system 900 with electric vehicle charging capability including a PV inverter and one or more hybrid inverters and battery packs, according to still other embodiments of the present disclosure. System 900 differs from system 800, in that the storage inverter is omitted. System 900 has a number of advantages. For example, a PV inverter 906 is first installed to provide energy to home backup loads 116 or AC grid 114. As such, any excess energy that is not consumed by backup loads 116 will be wasted or fed to the AC grid. A hybrid inverter PCS 909 including a battery pack 918 may be economically added to efficiently store the excess energy and also to add power to the system. PV inverter 906 can be above-described PV inverter 106 in FIG. 106. Hybrid inverter PCS 909 and battery pack 918 may be similar to hybrid inverter PCS 809 and battery pack 818 that have been described in the sections above. It is noted that the battery pack may include a number of low voltage or high voltage batteries as described in sections above, so that the description will not be repeated for the sake of brevity.

Figure 10:
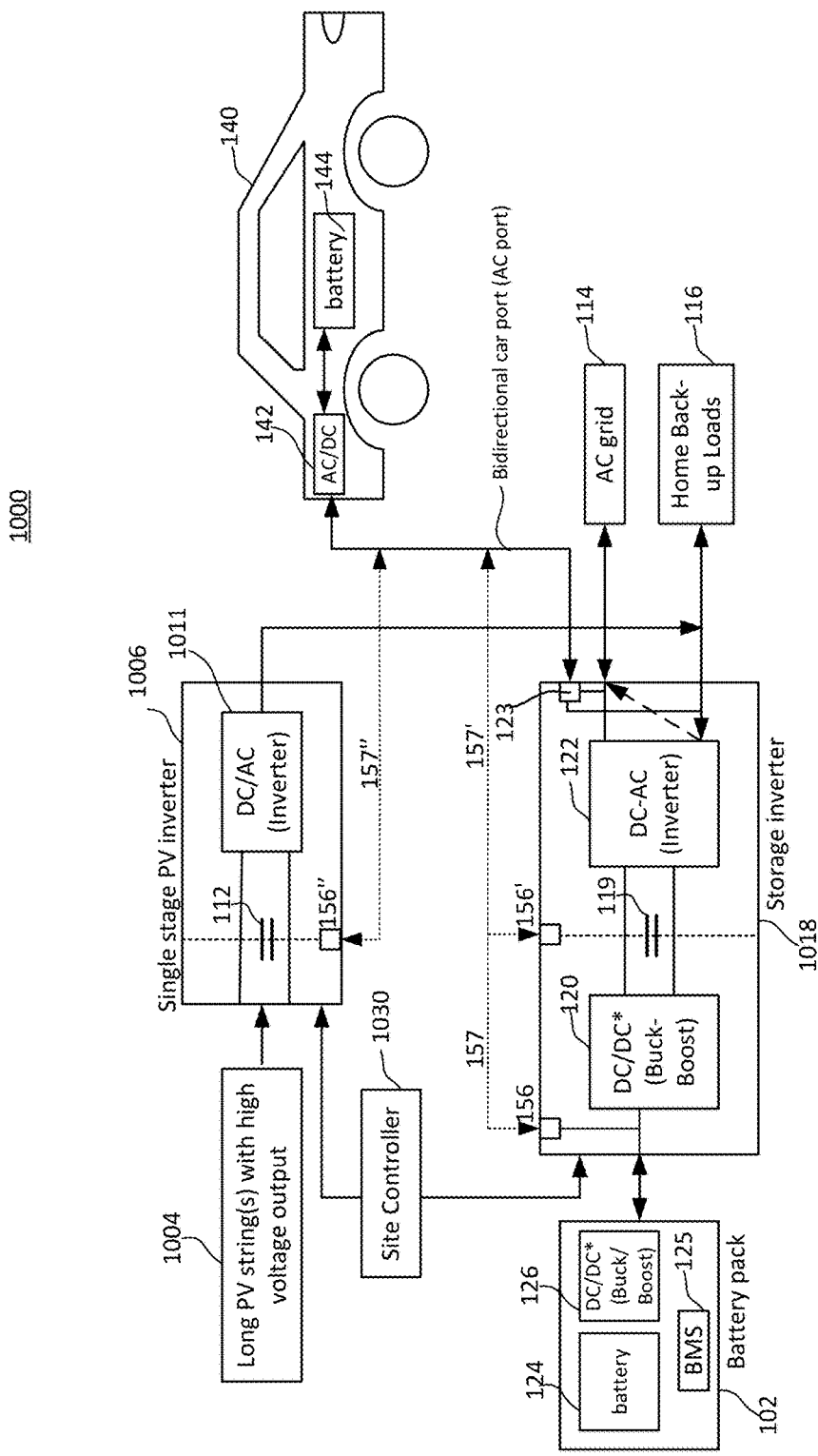
FIG. 10 is a block diagram of an exemplary solar energy generation and storage system with electric vehicle charging capability including a single stage PV inverter and a storage inverter, according to still other embodiments of the present disclosure.

FIG. 10 illustrates a block diagram of an exemplary solar energy generation and storage system 1000 with electric vehicle charging capability including a single stage PV inverter and a storage inverter, according to still other embodiments of the present disclosure. System 1000 is similar to system 100 with the difference that PV inverter 1006 does not include a DC/DC boost converter because the PV string(s) 1004 is a long PV string with high voltage output (e.g., 400V to 1000V). This is the case when a large number of solar PV modules can be installed, e.g., in farmland or in areas with a large surface. In some embodiments, PV inverter 1006 may be a single stage DC/AC inverter when the voltage provided by long PV string(s) 1004 is sufficiently high.

Figure 11:
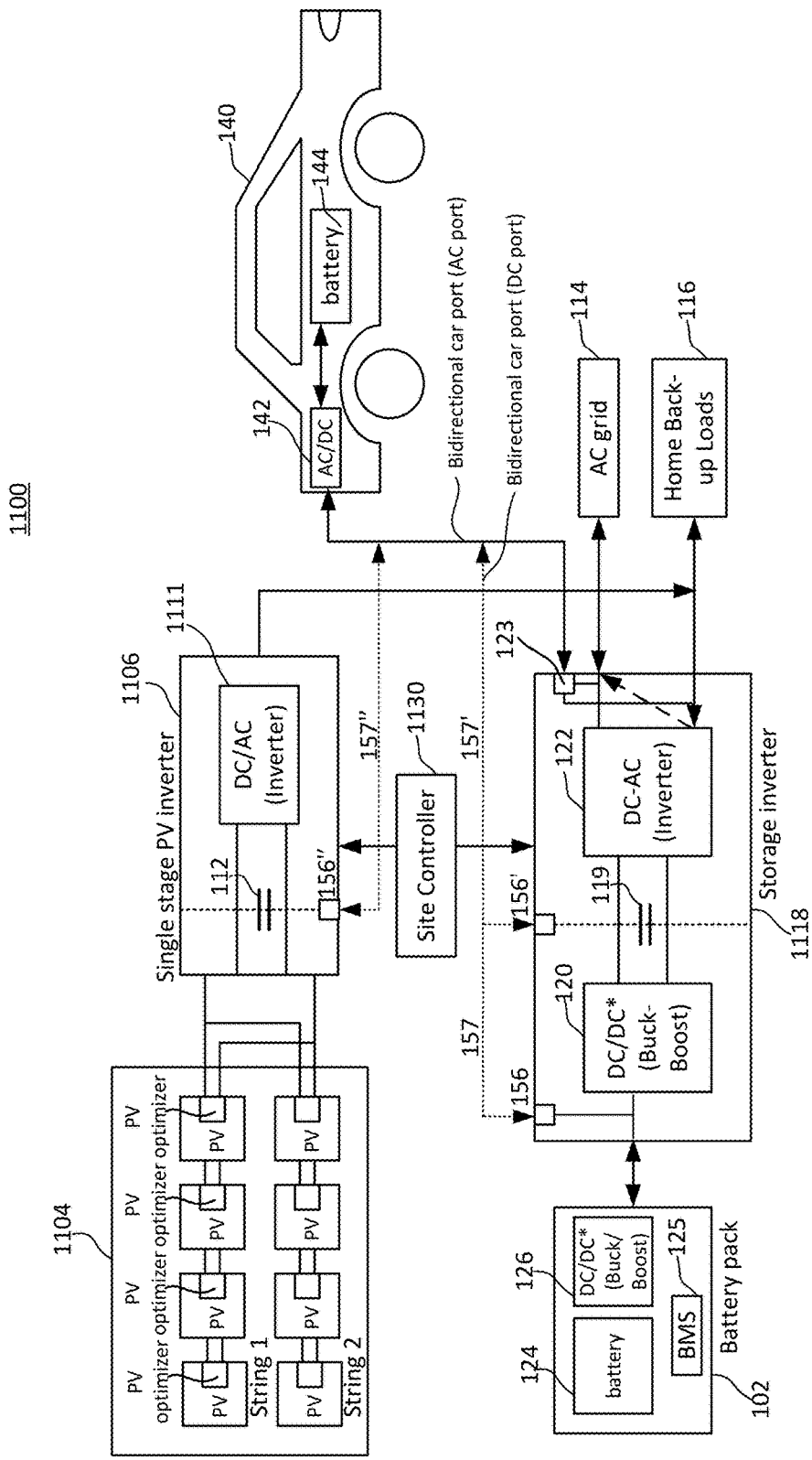
FIG. 11 is a block diagram of an exemplary solar energy generation and storage system with electric vehicle charging capability including a single stage PV inverter with a PV optimizer and a storage inverter, according to still other embodiments of the present disclosure.

FIG. 11 illustrates a block diagram of an exemplary solar energy generation and storage system 1100 with electric vehicle charging capability including a single stage PV inverter 1106 with a PV optimizer 1104 and a storage inverter 1118, according to still other embodiments of the present disclosure. System 1100 is similar to system 1000 with the difference that system 1100 includes a number of PV optimizer strings (e.g., string 1, string 2) instead of the long string(s) in system 1000. Each string may include a number of PV optimizers that are interconnected with each other. Although two strings of PV optimizers are shown in the example embodiment in FIG. 11, it is understood that system 1100 can have any number N of PV optimizer strings. In some embodiments, the PV optimizers strings are located on the roof. In other embodiments, the PV optimizers strings are located below the roof. In some embodiments, the PV optimizers may include buck and/or boost converters that can be connected in series or in parallel dependent from applications. DC/AC inverter 1111 is coupled to the PV optimizers through capacitor bank 112 and converts the received DC energy into AC energy to provide to home backup loads 116 or to storage inverter 1118. System 1100 may include a site controller 1130 configured to automatically select between PV inverter 1106 and storage inverter 1118 to provide power to the home backup loads or to the AC grid.

Figure 12:
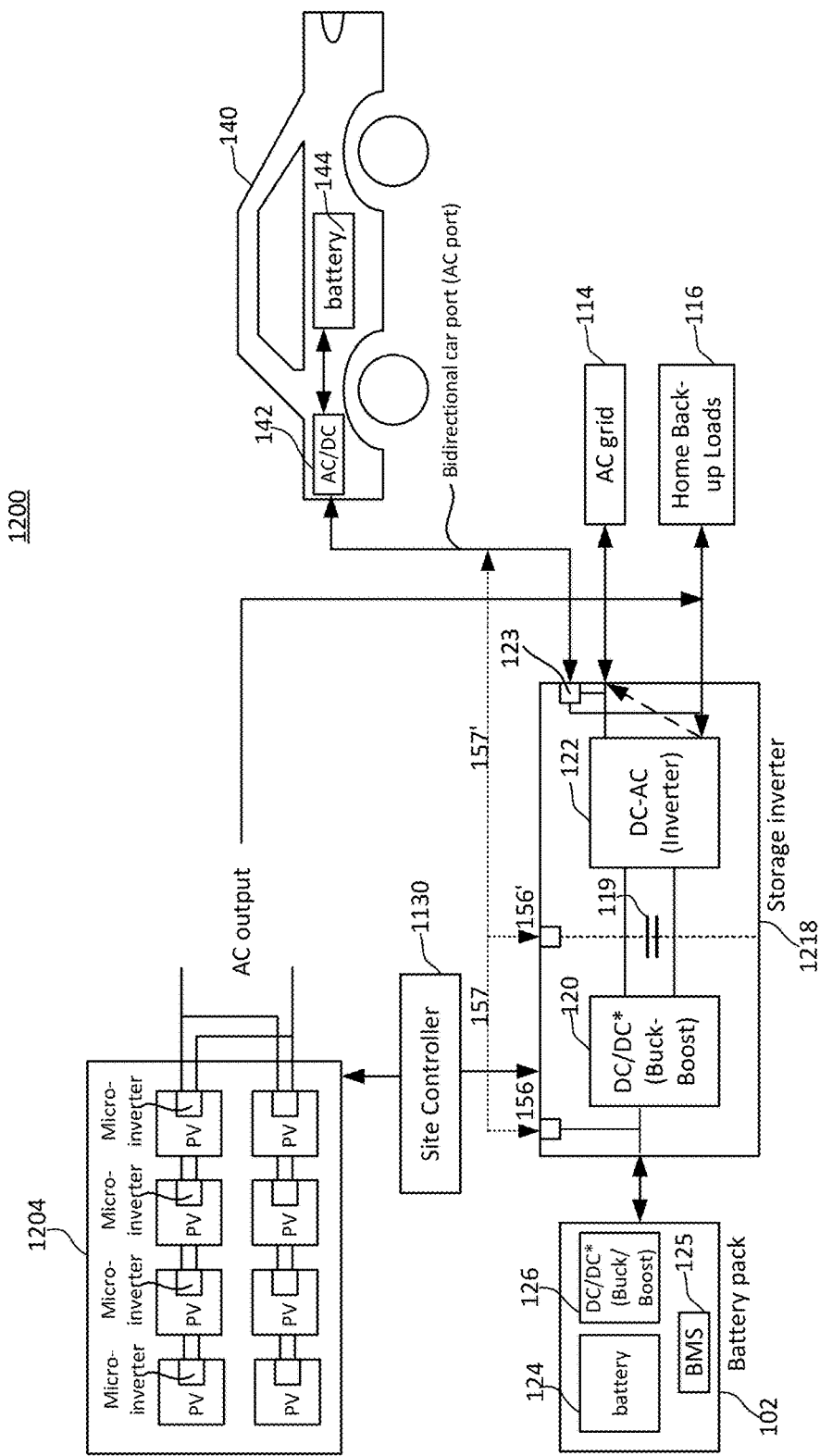
FIG. 12 is a block diagram of an exemplary solar energy generation and storage system with electric vehicle charging capability including micro-inverters and a storage inverter, according to still other embodiments of the present disclosure.

FIG. 12 illustrates a block diagram of an exemplary solar energy generation and storage system 1200 with electric vehicle charging capability including a plurality of micro-inverters 1204 and a storage inverter 1218, according to still other embodiments of the present disclosure. System 1200 is similar to system 1100 with the difference that system 1200 includes a number of micro-inverters connected in series and in parallel to directly provide AC power to home backup loads 116 without a PV inverter of system 1100. System 1200 may also include a site controller 1130 configured to automatically select between micro-inverters 1204 and storage inverter 1218 to provide power to the home backup loads, to the AC grid, or to battery 144 of EV 140. In some embodiments, the systems 1000, 1100 and 1200 may have hybrid inverter PCSs instead of storage inverters.

Embodiments of the present disclosure may be implemented in off-grid battery charging stations set up along roads or highway exits. Such charging stations may include a roof covered with photovoltaic string(s), and all other components shown in the various embodiments disclosed herein. The solar energy generation and storage system, including, e.g., PV inverter(s) and/or storage inverter(s) and/or hybrid inverter(s) and low voltage/high voltage battery packs, may be housed in a secure room that is only accessible to authorized personnel, e.g., a maintenance operator. The solar energy generation and storage system may be a stand-alone system that is not connected to the AC grid. A site controller similar to those shown in FIG. 1-12 may enable a user to select between a slow charging (AC charging) mode or fast charging (DC charging, supercharging) mode. Such system may also include an automatic payment system that can bill the user according to the amount of energy used or the selected charging mode.

The embodiments described herein are not to be limited in scope by the specific embodiments described above. Indeed, various modifications of the embodiments, in addition to those described herein, will be apparent to those of ordinary skill in the art from the foregoing description and accompanying drawings. Further, although some of the embodiments have been described herein in the context of a particular implementation in a particular environment for a particular purpose, those of ordinary skill in the art will recognize that their usefulness is not limited thereto and that they can be beneficially implemented in any number of environments for any number of purposes. Accordingly, the disclosure should be construed in view of the full breath and spirit of the embodiments as disclosed herein.

What is claimed is:

1. An inverter comprising:
 a battery pack connection for supplying energy to or receiving energy from a battery pack;
 an AC grid connection for supplying power to or receiving power from an AC grid;
 a connection for supplying power to a home back-up load;
 an electric vehicle connection for supplying to and receiving power from an electric vehicle (EV) battery; and
 a control input configured to receive one or more control signals for controlling the flow of power within the inverter,
 wherein the inverter, under the control of the one or more control signals, inverts power received from the battery pack and provides the inverted power to the electrical vehicle connection to charge the EV battery.

2. The inverter of claim 1 wherein the inverter is a storage inverter that further comprises a DC/DC buck-boost stage configured to couple to the battery pack, and a DC/AC inverter configured to selectively couple to a PV inverter, to the AC grid and to the home back-up load.

3. The inverter of claim 2 wherein the storage inverter comprises a DC car port coupled to the DC/DC buck-boost stage and configured to supply DC power to and receive DC power from the EV battery.

4. The inverter of claim 1 wherein the inverter is a hybrid inverter that further comprises a first DC/DC buck-boost stage configured to couple to one or more PV strings, and a DC/AC inverter configured to selectively couple to the AC grid, to the home back-up load, and to the EV battery under the control of the one or more control signals.

5. The inverter of claim 4 wherein the hybrid inverter further comprises a second DC/DC buck-boost stage coupled between the first DC/DC buck-boost stage and the battery pack and configured to supply power to the battery pack or receive power from the battery pack.

6. The inverter of claim 5 wherein the hybrid inverter further comprises a DC car port connection coupled to the second DC/DC buck-boost stage and configured to supply DC power to or receive DC power from the EV battery.

7. A system for energy conversion with electric vehicle charging capability, the system comprising:
 a photovoltaic (PV) inverter configured to receive DC power provided by a photovoltaic (PV) array and to generate AC power;
 a storage inverter coupled to the PV inverter, the storage inverter comprising:
  a battery pack connection for supplying energy to or receiving energy from a battery pack;
  an AC grid connection for supplying power to or receiving power from an AC grid;
  a connection for supplying power to a home back-up load;

an electric vehicle connection for supplying power to or receiving power from an electric vehicle (EV) battery; and a controller for generating one or more control signal to control the flow of power through both the PV inverter and the storage inverter, wherein the system, under the control of the one or more control signals, converts power received from one of a PV string and the battery pack to AC power and provides the converted power to the electric vehicle connection to charge the EV battery.

8. The system of claim 7, wherein the storage inverter further comprises:

a buck-boost stage coupled to the battery pack;

a bidirectional DC-AC inverter coupled to the PV inverter and configured to:

convert the AC power received from the PV inverter to DC output power to charge the battery pack through the buck-boost stage, and convert DC power received from the battery pack to AC power and selectively provide the AC power to the home back-up load and the AC grid; and a DC link coupled between the buck-boost stage and the bidirectional DC-AC inverter.

9. The system of claim 8, wherein the storage inverter further comprises a DC connection coupled to the buck-boost stage and configured to directly DC charge the EV battery.

10. The system of claim 9, wherein the DC connection is coupled to the DC link.

11. The system of claim 7, wherein the bidirectional DC-AC inverter is coupled to the EV battery through the electric vehicle connection.

12. The system of claim 7, wherein the battery pack is integrated in the storage inverter.

13. The system of claim 7, wherein the storage inverter further comprises a plurality of switches configured to set the system into a plurality of operation modes under the one or more control signals provided by the controller.

* * * * *